A. CARP.
QUICK ADJUSTING WRENCH.
APPLICATION FILED MAR. 28, 1912.
1,061,046.                                    Patented May 6, 1913.
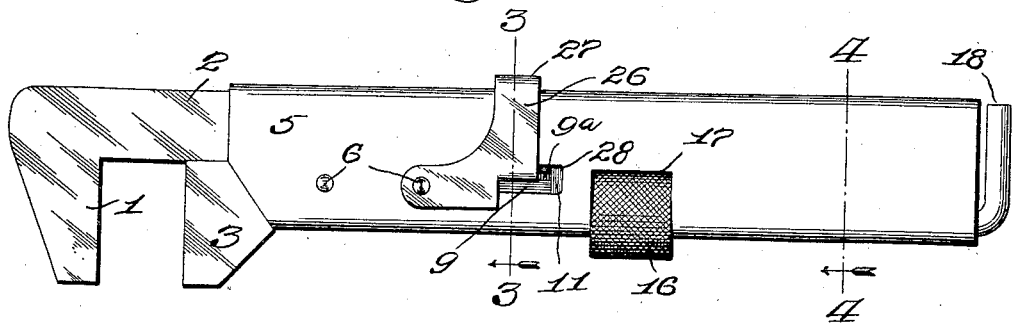
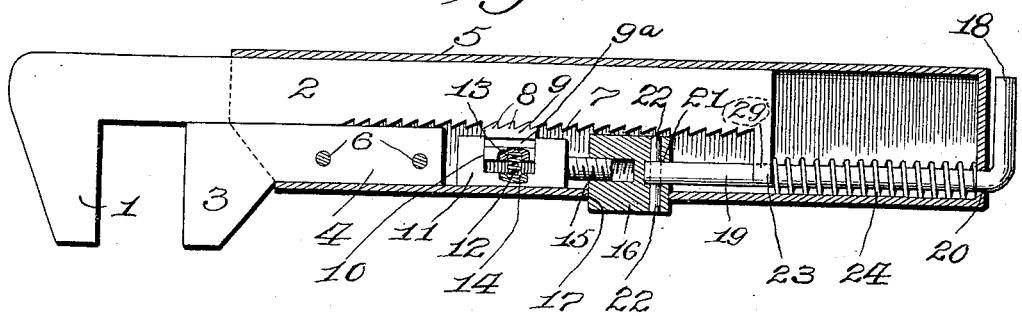

UNITED STATES PATENT OFFICE.

ARTHUR CARP, OF ST. LOUIS, MISSOURI.

QUICK-ADJUSTING WRENCH.

1,061,046.  Specification of Letters Patent.  Patented May 6, 1913.

Application filed March 28, 1912. Serial No. 686,879.

*To all whom it may concern:*

Be it known that I, ARTHUR CARP, a subject of the Czar of Russia, and resident of St. Louis, Missouri, have invented certain new and useful Improvements in Quick-Adjusting Wrenches, of which the following is a specification containing a full, clear, and exact description, reference being had to the accompanying drawings, forming a part hereof.

My invention relates to an improved quick adjusting wrench, and consists in the novel construction hereinafter described and pointed out in the appended claims.

The object of my invention is to provide an improved quick adjusting wrench, especially for use as an automobile wrench and in other work where quick adjustment is required, and which improved wrench shall be capable of quick and close adjustment to the nut and at the same time be reasonable in price as well as durable in construction.

In the drawings Figure 1 is a side elevation of a wrench embodying my invention; Fig. 2 is a sectional side elevation of the wrench; Fig. 3 is a sectional end view, the section taken on the line 3—3 of Fig. 1; and Fig. 4 is a view similar to Fig. 3, the section taken on the line 4—4 of Fig. 1.

The numeral 1 indicates the movable jaw which is provided with an integral sliding shank 2.

3 indicates the fixed jaw which is provided with an integral shank 4 fixed within the casing 5 by means of the rivets 6 so that said fixed jaw 3 projects upon the exterior of the casing at one end thereof and the shank 2 may slide in contact with said shank 4. The sliding shank 2 is adapted to move freely within the casing in the space between the said fixed shank and the wall of said casing. The inner edge of said sliding shank 2 is provided with a series of ratchet teeth 7, which are engaged by a series of teeth 8 of a spring-pressed dog 9 to prevent the withdrawal of the said sliding shank except when said dog is retracted. The said dog 9 is mounted loosely in a rectangular recess 10 of a sliding dog carrier 11, which carrier is mounted to slide, longitudinally of the casing 5, in the space at the inner end of said fixed shank 4. The spring 12 is adapted to force the teeth of said dog 9 into engagement with the teeth 7 of the said sliding shank 2, said spring having one of its ends located in a cylindrical spring socket 13 formed in the inner end of said dog, while the opposite end of said spring is located in a similar spring socket 14 formed in the adjacent wall of the said sliding carrier. Fixed to and projecting from one end of said sliding dog carrier 11 is a screw 15 upon which is threaded a cylindrical thumb nut 16, the periphery of which projects through an opening 17 in the casing 5 convenient for the operator's fingers. A nut handle 18 is located upon the exterior of the casing at the end thereof which is opposite the jaws, and said handle 18 is provided with an extension in the form of a rod 19 which extends within the casing through an opening 20 to the thumb nut 16, to which it is securely connected by suitable means. Herein I have shown the end of said rod 19 seated within a socket 21 formed in the end of said nut and secured to the nut by means of a pin or rivet 22, which is driven through registering apertures formed in the said nut and said rod in a well known manner. Formed upon the inner end of said sliding shank 2 is a laterally extending arm 23 against which rests the inner end of a coil spring 24. The outer end of said spring 24 rests against the end of the casing, and said coil spring is mounted upon the said rod 19, for the purpose of quickly forcing outwardly the sliding shank 2, when the movable jaw is to be adjusted outwardly in fitting the wrench to a nut. The said dog 9 is provided in one side with a groove 9ª so that the finger 25 of the retracting device 26 at all times rests loosely within said groove. Said retracting device 26 is pivoted at one end upon the exterior of the casing 5 by means of one of the rivets 6, and the said device is provided with a lateral extension 27 which forms a retracting button or thumb piece extending across the back of the casing convenient for operation. The finger 25 of the said retracting device 26 extends through an opening 28 formed in the side of the casing. The outward movement of the sliding shank 2 is limited by contact of the said lateral arm 23 with the adjacent end of the said thumb nut 16. The free end of the said lateral arm 23 is provided with a segmental bearing 29 which slides upon the rod 19 and acts as a guide for the said lateral arm, as well as for the inner end of said sliding shank.

The operation is as follows: Assuming that the parts are in the position shown in the drawing, when the operator desires to fit the wrench to a nut that is larger than the space between the jaws, he merely presses his thumb or finger upon the thumb piece 27, thereby causing the retracting finger 25 to retract the said dog 9 until its teeth are disengaged from the teeth of the said sliding shank 2, and the power of the spring 20 will then cause the said sliding shank and the movable jaw 1 to be quickly thrown outwardly to the limit of their outward movement, thereby enlarging the space between the jaws. Then the operator places the jaws upon the nut and presses the movable jaw 1 and its shank 2 inwardly until the jaws 1 and 3 closely fit the opposite sides of the nut; whereupon the dog spring 12 will urge the teeth of said dog into contact with the teeth of said sliding shank and securely lock the shank in position so that it cannot be withdrawn in tightening the nut until said dog is again retracted. Should it be desired to obtain a more accurate adjustment of the jaws to the nut, the same may be accomplished by turning the thumb nut 16, thereby drawing inwardly the dog carrier 11, the dog 9 and the sliding shank 2; or the nut 16 may be rotated by means of the nut handle 18, when it is desired to clamp the nut securely between the jaws. Likewise, when it is desired to use my improved wrench as a hand vise the handle 18 may be used to advantage.

I claim:

1. The improved quick-adjusting wrench, comprising two jaws adjustably mounted relative to each other, a sliding toothed-shank to which one of said jaws is connected, a dog-carrier mounted to slide parallel with said shank and having a dog-retaining recess, a toothed-dog mounted in said recess to be projected and retracted laterally for coöperation with the teeth of said sliding-shank, a spring for quickly projecting said shank in separating the jaws, and means for retracting said toothed-dog to release said spring, in combination with a screw and nut for sliding and locking said dog-carrier to after the relation of the teeth of said dog and those of said sliding-shank, a jaw-clamping nut-handle at the end of the wrench opposite that at which the jaws are located, and a suitable connection extending from said nut-handle to said nut.

2. The improved quick-adjusting wrench, comprising a casing, two jaws adjustably mounted relative to each other, a sliding toothed-shank to which one of said jaws is connected, a shank fixed in said casing and carrying the other jaw, a dog-carrier mounted to slide parallel with said toothed-shank in the space at the inner end of said fixed shank and having a dog-retaining recess, a toothed-dog mounted in said recess to be projected and retracted laterally for coöperation with the teeth of said sliding-shank, a screw extending from the inner end of said dog-carrier also in said space at the inner end of said fixed-shank, a nut on the inner end of said screw, a spring for quickly projecting said shank in separating the jaws, and means for retracting said toothed-dog to release said spring.

In testimony whereof, I have signed my name to this specification, in presence of two subscribing witnesses.

ARTHUR CARP.

Witnesses:
E. L. WALLACE,
JOHN C. HIGDON.

---

Copies of this patent may be obtained for five cents each, by addressing the "Commissioner of Patents, Washington, D. C."